United States Patent
Gekht et al.

[11] Patent Number: 6,109,877
[45] Date of Patent: Aug. 29, 2000

[54] TURBINE BLADE-TO-DISK RETENTION DEVICE

[75] Inventors: Eugene Gekht, Brossard; Mike Louis Paul Fontaine, Candiac, both of Canada

[73] Assignee: Pratt & Whitney Canada Corp., Longueuil, Canada

[21] Appl. No.: 09/197,607

[22] Filed: Nov. 23, 1998

[51] Int. Cl.$^7$ .................................................. F01D 5/30
[52] U.S. Cl. ................ 416/221; 416/220 R; 416/204 A; 416/207; 416/244 R; 416/244 A; 416/248
[58] Field of Search ............................... 416/221, 220 R, 416/207, 204 A, 244 R, 244 A, 248

[56] References Cited

U.S. PATENT DOCUMENTS

| | | |
|---|---|---|
| 2,761,648 | 9/1956 | Purvis . |
| 2,847,187 | 8/1958 | Murphy . |
| 2,942,842 | 6/1960 | Hayes . |
| 2,971,744 | 2/1961 | Szydlowski ............................. 416/221 |
| 3,045,329 | 7/1962 | Carli et al. ............................. 416/221 |
| 3,057,598 | 10/1962 | Boyle et al. ............................. 416/221 |
| 3,076,634 | 2/1963 | Boyle et al. ............................. 416/221 |
| 3,202,398 | 8/1965 | Webb . |
| 3,216,699 | 11/1965 | Schoenborn . |
| 3,248,081 | 4/1966 | Bobo et al. . |
| 3,383,095 | 5/1968 | Anderson . |
| 3,479,009 | 11/1969 | Bean ....................................... 416/221 |
| 3,598,503 | 8/1971 | Muller . |
| 3,653,781 | 4/1972 | Cooper . |
| 4,029,436 | 6/1977 | Shoup, Jr. et al. . |
| 4,457,668 | 7/1984 | Hallinger . |
| 4,483,661 | 11/1984 | Manharth et al. . |
| 4,730,983 | 3/1988 | Naudet et al. . |
| 4,872,810 | 10/1989 | Brown et al. . |
| 5,281,097 | 1/1994 | Wilson et al. . |
| 5,518,369 | 5/1996 | Modafferi . |

FOREIGN PATENT DOCUMENTS

| | | |
|---|---|---|
| 1031802 | 6/1953 | France . |
| 1032753 | 6/1958 | Germany . |
| 1051286 | 6/1958 | Germany . |
| 671960 | 5/1952 | United Kingdom . |
| 925273 | 5/1963 | United Kingdom . |

*Primary Examiner*—Edward K. Look
*Assistant Examiner*—Ninh Nguyen
*Attorney, Agent, or Firm*—Jeffrey W. Astle

[57] ABSTRACT

The invention provides a turbine blade retention device installed in an axially extending gap between the blade root bottom and the slot floor. The retention device has two parts: a blade root retention clip and a spacer bar. The clip has an elongated web of a selected web thickness and width less than the width of the slot floor. The clip includes a forward and a rearward transverse flange extending radially outwardly and extending laterally from forward and rearward ends of the web. The flanges serve to engage the forward and rearward faces of the rotor hub disk respectively, and to engage forward and rearward faces of an associated blade root. The height of at least one flange is less than the gap depth to permit conventional sliding installation the blade root. The spacer bar is installed in the gap between the clip and slot floor to hold the clip radially outward in engagement with the forward and rearward faces of the blade root. The spacer bar has a thickness that, together with the clip web thickness, substantially equals the gap depth. Preferably, the spacer bar extends axially through the gap and has forward and rearward bent over tabs for engaging the forward and rearward faces of the rotor disk hub.

11 Claims, 5 Drawing Sheets

TURBINE BLADE-TO-DISK RETENTION DEVICE

TECHNICAL FIELD

The invention is directed to a turbine blade retention device installed in an axially extending gap between the turbine blade root bottom and the interlocking slot floor including two components: a blade root retention clip and a spacer bar.

BACKGROUND OF THE ART

Turbine rotors include a peripheral array of individually manufactured blades mounted to the rotor hub with interlocking grooves and blade roots. The blades must be securely mounted to withstand high rotational speeds, axial loading of gas flow and high temperature variations during operation. However, since blades are periodically removed during repairs and inspection, blade locking mechanisms ideally should be capable of rapid removal and reuse with minimal damage to the hub and blade root.

Various locking devices have been proposed and used in the prior art. In many cases the locking mechanisms require their own machined and accurately fitting parts which add to complication of manufacturing and cost. In some cases, the prior art locking devices include machined notches or other structural features which can result in stress concentrations in components which are already highly stressed. In addition, some prior art blade locking devices and methods include use of parts such as rivets which must be removed and discarded during blade replacement operations. Removal risks damaging of adjacent hub and blade surfaces, and as well increases the overall cost of the fastening system by requiring skilled labour for installation and inspection as well as by producing scrap.

Examples of common rotor blade locking devices are found in U.S. Pat. No. 2,761,648 to Purvis et al. and U.S. Pat. No. 3,598,503 to Muller. Both of these systems use a bent sheet metal bar inserted between the blade root and radially inward floor of the machined groove in the rotor hub to positively engage both components together. Other examples include a leaf-spring locking bar with mating groove in the blade root as shown in U.S. Pat. No. 2,847,187 to Murphy, and U.S. Pat. No. 5,518,369 to Modafferi which utilizes a simple bent bar disposed between the rotor hub and the underside of blade platforms.

A significant disadvantage of the above examples of the prior art is that a single component is used to resist the forces that would dislodge the blade from the root hub and for locking the blade to the hub itself. In general, the locking function is performed by bending a sheet metal bar for example.

Utilizing a single component introduces a trade-off between a desire for high strength and for high ductility. In general, high strength metals tend to be more brittle or less ductile, while highly ductile metals are of relatively low strength. High strength materials have the advantage of reduced weight and size, which is especially critical in aircraft design. Blade locking mechanisms that include bent or deformed connectors require sufficient ductility to be bent during installation. Materials which are ductile and easily bent are generally of much lower yield strength than hardened or heat treated materials which will have a high strength to weight ratio and can be used for efficient resisting of high forces.

Further disadvantages of prior art systems are that the blade is often not restrained on both sides of the rotor hub and that the amount of bearing area available for resisting forces is limited.

A further disadvantage of prior art systems is that bending bars raises concern over fatigue stress cracking in the bent area. Repeated bending during multiple installation and removal increases the likelihood of metal fatigue failure. Disposal of aircraft engine quality materials is highly undesirable and expensive, however, if bent bars are used to resist forces between the hub and blade, repeated use of the bars is not practical.

As an object of the present invention therefore, to provide an easily manufactured and installed blade locking mechanism which fully restrains the blade in both directions axially and does not introduce undesirable waste of material, metal fatigue concerns or risk of stress concentration.

DISCLOSURE OF THE INVENTION

The invention provides a novel turbine blade retention device installed in an axially extending gap between the blade root bottom and the slot floor. The retention device has two parts: a blade root retention clip and a spacer bar.

The clip has an elongated web of a selected web thickness and width less than the width of the slot floor. The clip includes a forward and a rearward transverse flange extending radially outwardly and extending laterally from forward and rearward ends of the web. The flanges serve to engage the forward and rearward faces of the rotor hub disk respectively, and to engage forward and rearward faces of an associated blade root. The height of at least one flange is less than the gap depth to permit conventional sliding installation the blade root.

The spacer bar is installed in the gap between the clip and slot floor to hold the clip radially outward in engagement with the forward and rearward faces of the blade root. The spacer bar has a thickness that, together with the clip web thickness, substantially equals the gap depth. Preferably, the spacer bar extends axially through the gap and has forward and rearward bent over tabs for engaging the forward and rearward faces of the rotor disk hub.

The I-shaped retention clip restrains the blade root from both sides of the rotor disk, has four load bearing surfaces on the flanges to distribute load uniformly and can be reused indefinitely. The spacer bar merely holds the clip in contact with the blade root and can be a simple bent plate of relatively inexpensive metal.

The retention clip is easily manufactured from a U-shaped blank cut transversely into I-shaped clips, thus avoiding the complex machining of prior art devices. The retention clip is not bent or flexed during installation as in prior art systems, therefore it can be manufactured of extremely high strength material (such as A286 for example) to achieve high strength to weight properties most advantageous in aircraft production. The locating of the retention clip and spacer at the base of the blade root avoids interference with the installation of cover plates, blade platforms or other structures toward the periphery of the rotor hub.

The spacer bar is bent during installation and requires adequate ductility for this purpose, however the spacer bar does not resist load and merely serves to hold the retention clip in position. Accordingly the spacer clip can be manufactured of relatively low strength and low cost material, such as nickel alloy (Inco 600 for example, trade mark). Spacer bars of differing thickness can be used as shims to compensate for minor errors in machining of the slots to an appropriate depth or to improve the accuracy of fitting the blade roots into the slots.

Of particular advantage, the retention clip and spacer require no major change to blade roots and rotor disks of engines already in service. No significant reworking is required to retrofit the clip and spacer to existing equipment. No major changes to the manufacturing procedures for these parts are required. The main alteration required is to machine the retention slots deeper to provide a gap between the blade root bottom and the floor of the retention slot in order to accommodate the clip and spacer. In many cases, such a gap is already provided as an intake manifold structure for conducting cooling air into the internal cooling channels extending within the blade from the blade root to the trailing edges of the blade. In contrast, the machining of notches or drilling of holes required by the prior art can introduce undesirable zones of stress concentration in addition to the cost of machining.

The simple design requires no special procedure or tools for installation and minimizes the risk of damage to blades or rotor hubs. All load bearing contact is limited to the planar rotor hub surfaces. The retention system can be adapted to any existing style of blade root as an inexpensive alternative to complex prior art systems. The clips and spacer bars are very easy to manufacture, and can be readily inspected or replaced during routine maintenance.

The scope of the invention includes any other means of securing the clip in position, however it is considered most likely that the use of a simple spacer bar will be preferred by users due to it's low cost, high reliability and ease of inspection. Other securing means may include threaded fasteners, snap-locking mechanisms for example.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein:

FIG. 6 is a partial radial sectional view as in FIG. 1 but showing the blade retention clip installed with web on the slot floor prior to sliding the blade root over the flange of the clip;

FIG. 7 is a like radial view with the blade root installed by axially sliding over the flange of the clip while the clip web remains resting on the slot floor;

FIG. 8 is a partial axial sectional view along line 8—8 of FIG. 7 through the disk and installed blade, indicating with arrows that when the spacer is wedged between the web of the clip and the slot floor, the clip is forced upward as drawn into secure engagement with the blade root; and FIG. 9 is a like view with the spacer fully installed between the clip and slot floor and indicating with an arrow the bending of the end of the spacer to secure the spacer in position, completing the installation as shown in FIGS. 1 and 3.

DETAILED DESCRIPTION OF PREFERRED EMBODIMENTS

Figure 1:
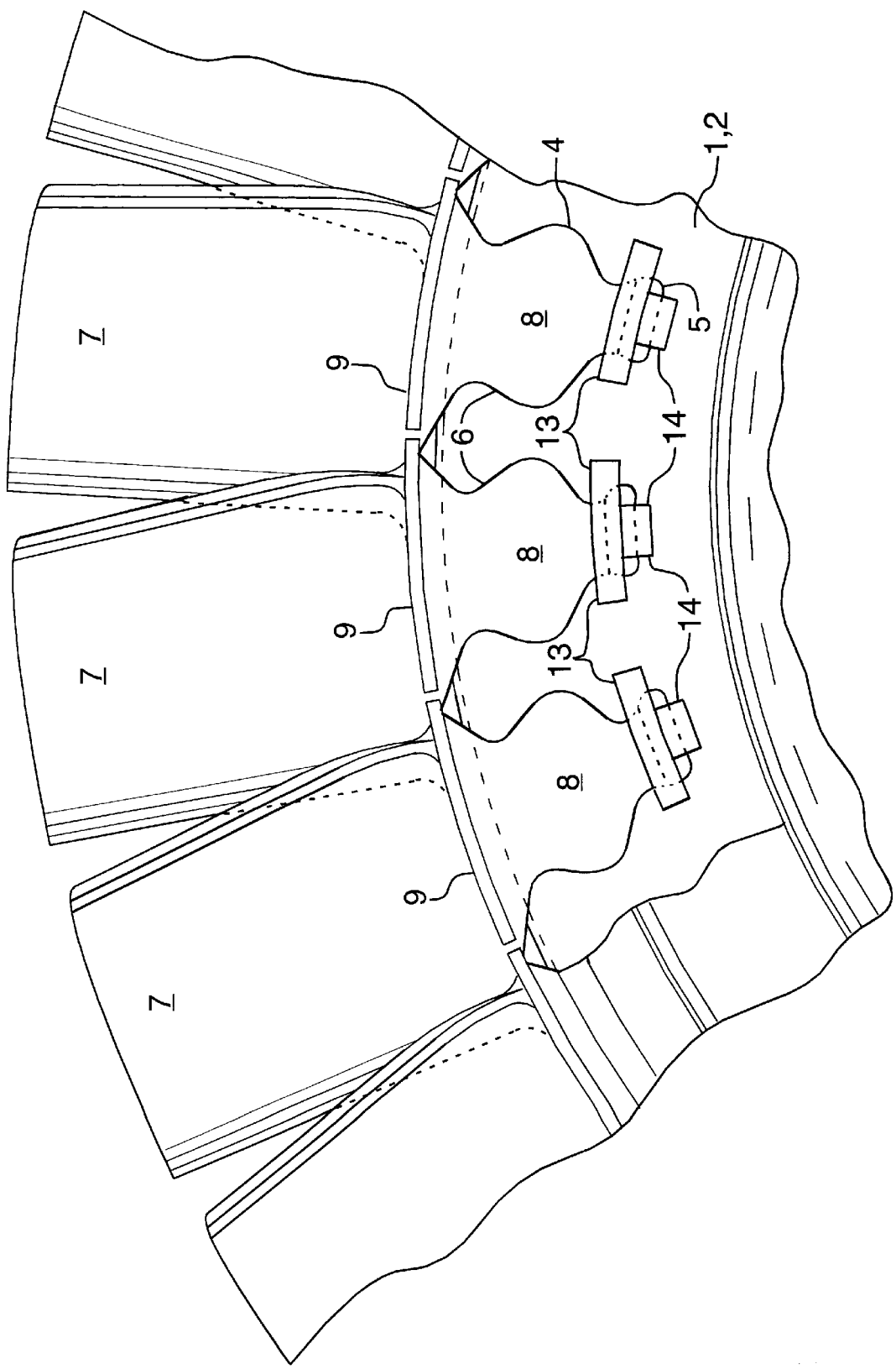
FIG. 1 is a partial radial sectional view showing an outer portion of a turbine rotor assembly which includes a central rotor hub disk with a peripheral circumferentially spaced apart array of axially extending blades retained in blade retention slots including, at the radially inner end of the blade root, a two part retention device.

FIG. 1 shows a partial view of a forward face of an axially symmetric turbine rotor assembly. The rotor assembly includes, as in conventional, a rotor hub disk 1 having a selected thickness with a forward face 2 and a rearward face 3. Around the periphery of the rotor hub 1, is a plurality of circumferentially spaced apart axially extending blade retention slots 4. Each blade retention slot 4 has a radially inward floor 5, of a selected width and two side walls 6. The turbine rotor assembly includes radially extending turbine blades 7, each with blade roots 8 and platforms 9 as is conventional.

The blade roots 8 and slot side walls 6 each have meeting ridges and grooves adapted for axial sliding engagement between the blade root 8 and sidewalls 6.

In the embodiment shown the interlocking ridges and grooves form what is known commonly as a fir tree arrangement, however, as known to those skilled in the art, several other common configurations can be used. In all cases however, the blade root 8 and slot 4 are interconnected with axial sliding engagement. Conventional blade retention devices serve to secure the root 8 from sliding after installation in the slots 4.

Figure 3:
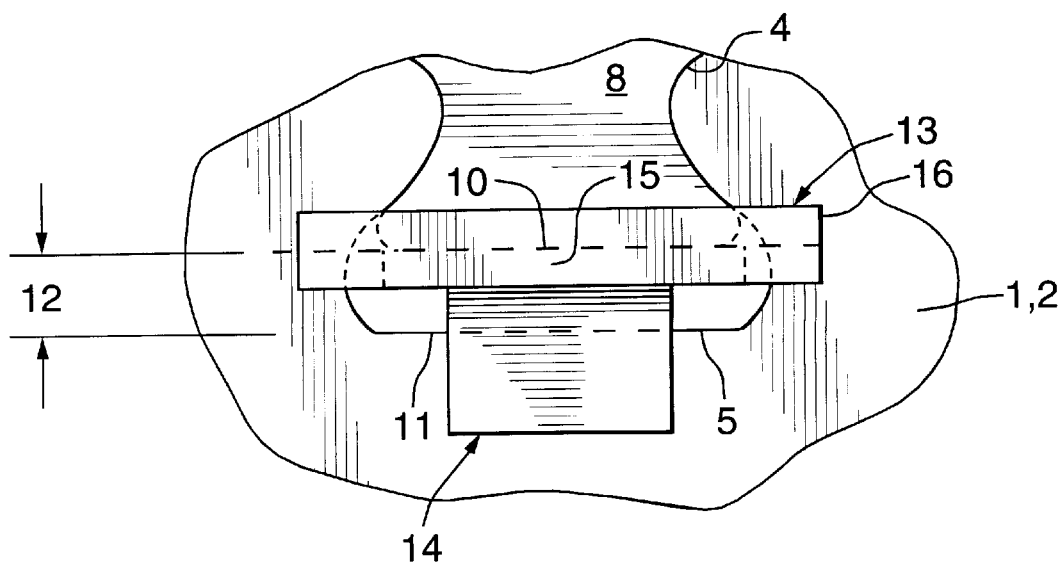
FIG. 3 shows a detail view of the two part turbine blade retention device with the retention clip and spacer bar installed in the gap between the bottom of the blade root and the floor of the blade retention slot.

As shown most clearly in the detail of FIG. 3, the blade root 8 has a bottom surface 10 which is radially spaced from the adjacent slot floor 11, defining an axially extending gap 12 of a selected radial depth as indicated in FIG. 3. As mentioned above, this gap 12 is often provided in conventional installations as a pathway for cooling air which is conveyed through openings in the blade root 8 and upward through cooling channels into the blade interior.

The invention relates to a blade root retention device that is installed in this gap 12 as explained in detail below. As shown best in FIG. 4, an I-shaped blade root retention clip 13 is installed in the gap 12 and is held in place with a spacer bar 14.

The clip 13 has an elongated web 15 extending axially through the rotor hub 1. The web 15 has a defined thickness, for example as shown in the drawings, of approximately half the depth of the gap 12. The clip 13 has a width less than the width of the slot floor 11. Extending radially outwardly (or up as drawn in the Figures) and extending laterally in both directions from the forward and rearward ends of the web 15 are transverse flanges 16. The height of at least one of the flanges 16 is less than the height of the gap 12 in order to permit the sliding installation of the blade root 8 into the slot 4. The blade root 8 passes over the top of one flange 16 during installation as it slides in the slot 4.

After installation, the clip 13 is raised or moved radially outwardly into engagement with the bottom surface 10 of the blade root 8 and the spacer bar 14 is inserted into the gap between the clip 13 and the slot floor 11. The spacer bar 14 holds the clip 13 radially outward in the engagement with the forward and rearward faces of the blade root 8.

Figure 2:
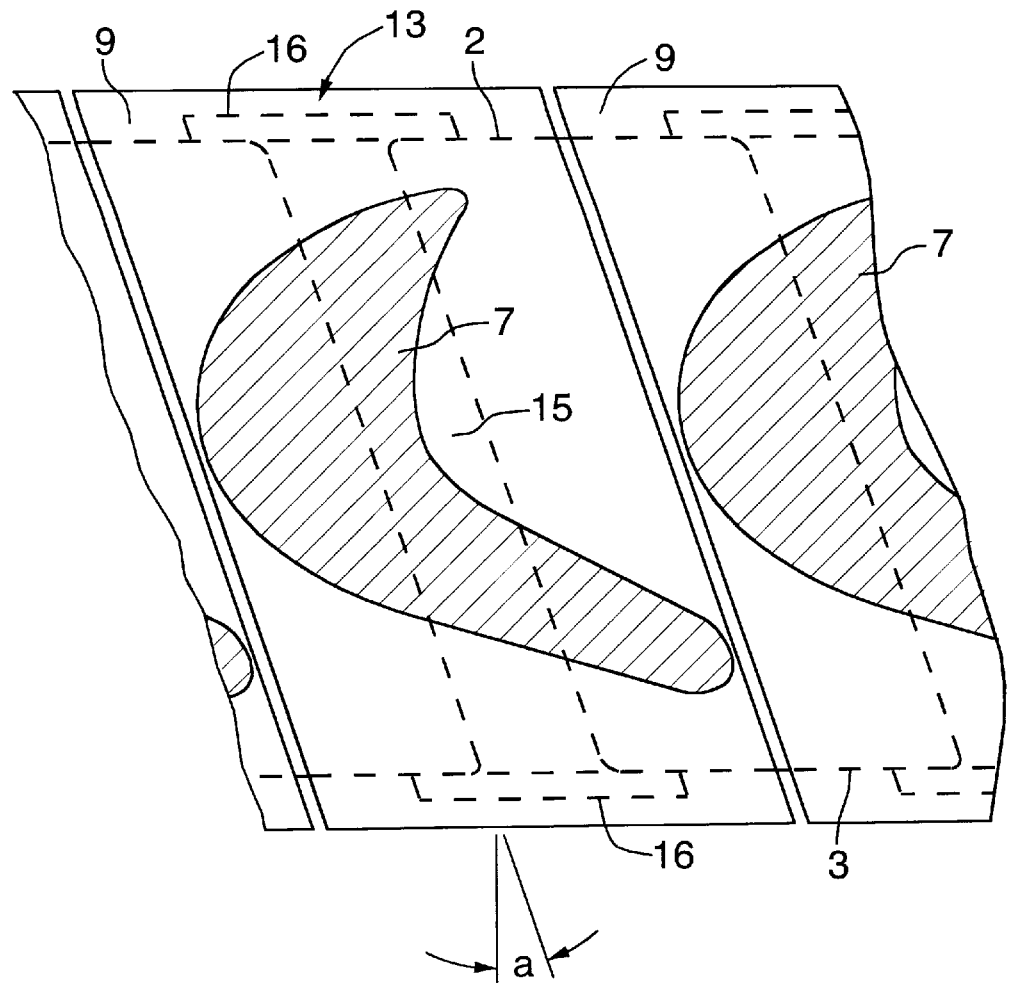
FIG. 2 shows a sectional view through a blade indicating the angular orientation of the blade root, slot and the blade retention clip in a gap between the bottom of the blade root and the floor of the blade retention slot.

In the installed position as indicated in FIGS. 1, 2 and 3, the flanges 16 engage the forward and rearward faces 2 and 3 of the rotor hub 1 and engage the forward and rearward faces of the associated blade root 8.

Figure 4:
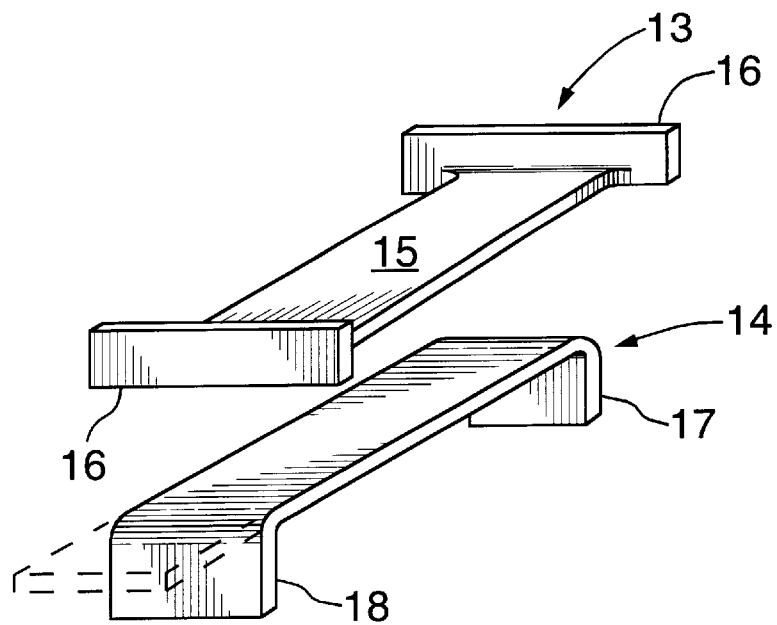
FIG. 4 shows an exploded perspective view of the blade retention clip and spacer bar.

It will be understood that various means to hold the clip 13 radially outwardly in engagement with the bottom surface 10 of the blade root 8 are possible, however, in the preferred embodiment illustrated, a simple elongated spacer bar 14 is used to advantage. The spacer bar 14 has a thickness that together with the thickness of the clip web 15 substantially equals the gap depth 12. In this manner, the spacer bar 14 is press fit and secures the clip 13 and blade root 8 into the slot 4 in a simple effective manner. As indicated in FIG. 4, it is contemplated that the most advantageous arrangement is where the bar 14 extends completely axially through the gap 12 from one side of the hub 1 to the other. However, other means to retain the clip 13 in the installed position are within contemplation of this invention.

The bar 14 includes forward and rearward tabs 17 and 18 to engage the forward and rearward faces 2, 3 of the rotor disk hub 1. As indicated in dashed outline in FIG. 4, the spacer bar 14 is pre-manufactured with only one tab 17 and is formed into an L-shape. After installation, the second tab 18 is formed by bending the extending portion radially inwardly to secure the spacer bar 14 in position.

Manufacture of the clip 13 and bar 14 are extremely simple matters. The sheet metal bar 14 can be cut from plate and bent with commonly available dies or shears.

Figure 5:
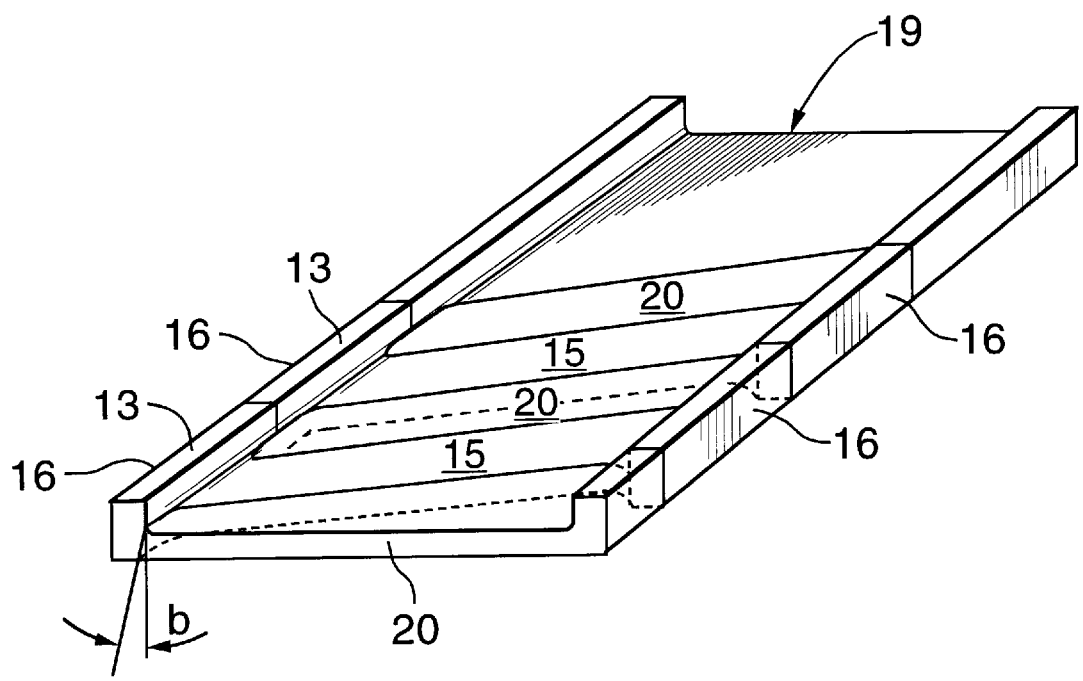
FIG. 5 is a perspective view showing the means by which the blade root retention clip can be manufactured from a U-shaped blank.

To form the clip 13, as shown in FIG. 5, the inventor contemplates machining or welding a U-shaped blank 19, with flanges and web formed integrally. In order to cut the I-shaped clip, common metal cutting procedures such as plasma cutting or saw cutting can be used to remove the unused web portions 20 and cut the flanges 16 from the blank 19. To assist in installing the clips 13 and spacer bar 14, it is expected that it would be of advantage to provide a bevel, as indicated with angle 'b' in FIG. 5 on the underside edges of the flanges 16. Of course, as indicated in FIG. 2, the I-shaped clip 13 must have the same angular orientation indicated as angle 'a', as does the blade roots 8 and slots 4.

As described above therefore, the invention provides a simple turbine blade retention device which requires minimal adaptation for installation in existing equipment, is easily manufactured, and overcomes the above described disadvantages with prior art devices.

Figure 7:
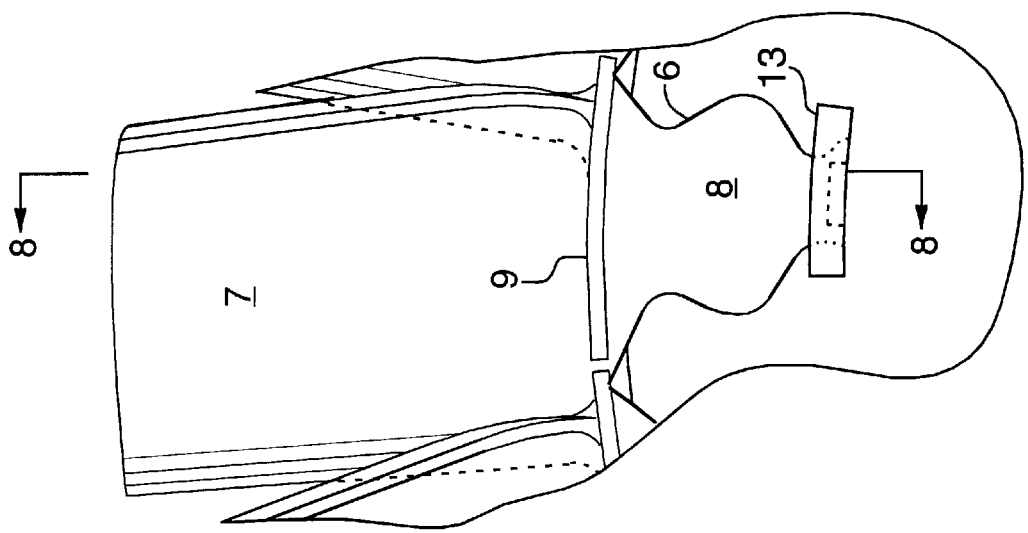
FIGS. 6–9 show the method of assembling the blades on the rotor disk in progression as follows.
Figure 6:
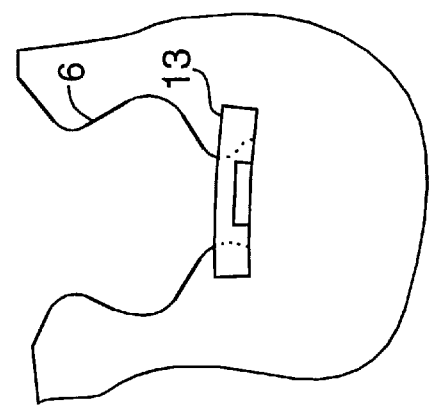
Figure 9:
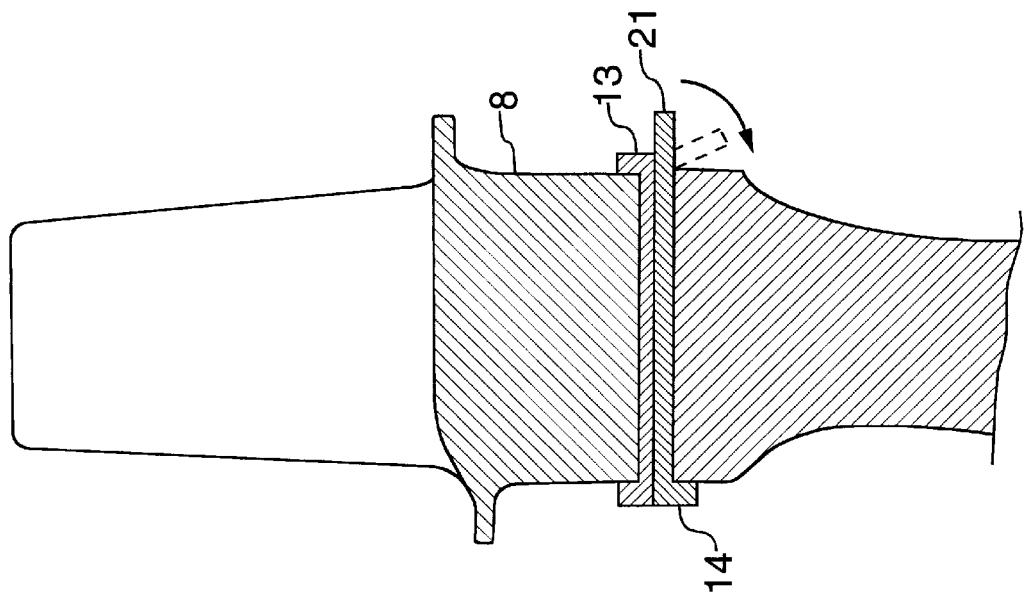
Figure 8:
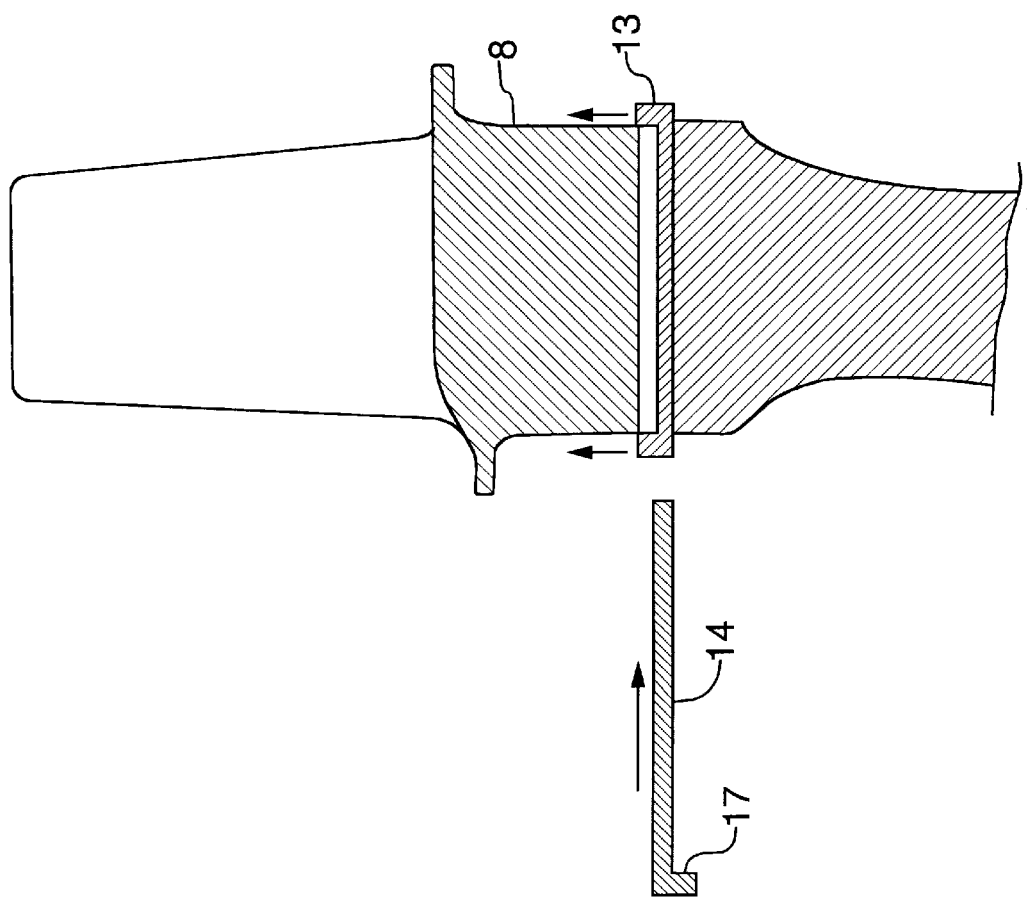

The simplicity of installation can be readily appreciated as follows. The assembly of the blades 7 to the rotor disk 1 begins first by installing the blade root retention clip 13 on the slot floor 11 as shown in FIG. 6. The clip 13 has an elongated web 15 approximately of length equal to the thickness of the rotor disk 1 as indicated in FIGS. 8 and 9. The clip 13 has forward and rearward transverse flanges 16 extending radially outwardly and extending laterally from forward and rearward ends of the web 13. To permit the blade root 8 to slide into the slot 4 at least one flange 13 has a height when the web 15 rests on the slot floor 11 not exceeding the gap depth 12. In the steps illustrated in FIGS. 6 and 7, the flanges 16 engage the forward and rearward faces of the rotor hub disk 1 but do not engage the faces of the blade root 8.

In the second step, the installer axially slides a blade root 8 into each slot 4, over one flange 16 of each clip 13 to result in the arrangement shown in FIG. 8. To permit sliding, the height of one flange 16 must not exceed the gap depth 12, however, the height of the other flange is not limited.

In the third step, as indicated in the progression from FIG. 8 to FIG. 9, axially sliding the spacer 14 between the slot floor 11 and the clip 13 moves the clip 13 radially outward (up as drawn) into engagement with the forward and rearward faces of the blade root 8 and rotor hub disk 1.

The fourth step shown in FIG. 9 involves securing the spacer 14 in position to retain the clip 13 and blade root 8 in the slot 4. Various means of securing the spacer 14 are within the contemplation of the invention including riveting or deforming the projecting end 21 for example however FIG. 9 shows a simple means of securing by merely bending the projecting end 21 as indicated by an arrow. As shown in FIG. 8, before installation the spacer 14 has a forward tab 17 at one end for abutting one face of the rotor hub disk 1 and has an axial length greater than the disk thickness such that as shown in FIG. 9 an opposite end 21 extends a distance beyond the other face of the disk 1 when the spacer 14 is positioned in the gap 12. As shown in FIG. 9, bending the opposite end 21 of the spacer 14 against the face of the disk 1 forms a rearward tab 18 to secure the assembly.

Therefore the retaining clip 13 is reusable indefinitely and may be fabricated of high strength materials. The spacer 14 may be used repeatedly however depending on the fatigue properties of the metal used and severity of the bend. The simple design of the spacer 14 makes it very inexpensive and this component may be recycled as scrap after every use to eliminate metal fatigue concerns.

Although the above description and accompanying drawings relate to a specific preferred embodiment as presently contemplated by the inventor, it will be understood that the invention in its broad aspect includes mechanical and functional equivalents of the elements described and illustrated.

What is claimed is:

1. A turbine blade retention device for use in an axially symmetric turbine rotor assembly including a rotor hub disk having a thickness, a forward face and a rearward face with a peripheral circumferential array of spaced apart blade retention slots extending between the forward and rearward hub faces at a selected angle thereto, each slot having a radially inward floor of a selected width and two side walls, the slot side walls each having mating ridges and grooves adapted for sliding engagement with a blade root of a turbine blade, the root having lateral sides disposed at said angle to forward and rearward root surfaces, wherein the blade root has a bottom surface which when engaged in said slot, is radially spaced from and adjacent the slot floor thus defining a gap extending between the forward and rearward hub faces at said selected angle, the improvement characterised in:

the turbine blade retention device comprising:

a blade root retention clip having an elongated web and including a forward and a rearward transverse flange extending radially outwardly and extending laterally from forward and rearward ends of the web, the web being disposed at said angle relative to the transverse flanges, the web adapted to be disposed in the gap with the height of at least one flange when the web rests on the slot floor not exceeding the gap depth to permit sliding engagement of the blade root in the slot, the flanges of said clip adapted to engage the forward and rearward faces of the rotor hub disk and the forward and rearward faces of an associated blade root when slid radially outward once the blade root is engaged in the slot; and clip securing means for holding the clip radially outward to engage the forward and rearward faces of the blade root and rotor hub disk when assembled.

2. A turbine blade retention device according to claim 1, wherein the securing means comprises a spacer bar disposed when assembled in the gap between the clip and slot floor.

3. A turbine blade retention device according to claim 2 wherein the spacer bar has a thickness that, together with the clip web thickness, substantially equals the gap depth.

4. A turbine blade retention device according to claim 3 wherein the bar extends through the gap from the forward hub face to the rearward hub face.

5. A turbine blade retention device according to claim 4 wherein the bar includes forward and rearward tabs engaging the forward and rearward faces of the rotor disk hub.

6. An axially symmetric turbine rotor assembly including a rotor hub disk having a thickness, a forward face and a rearward face with a peripheral circumferential array of spaced apart blade retention slots extending between the forward and rearward hub faces at a selected angle thereto, each slot having a radially inward floor of a selected width and two side walls, the rotor assembly including a plurality of radially extending turbine blades with blade roots, the blade roots and slot side walls each having mating ridges and grooves adapted for sliding engagement, the root having lateral sides disposed at said angle to forward and rearward root surfaces, each blade root having a bottom surface radially spaced from and adjacent the slot floor thus defining a gap extending between the forward and rearward hub faces at said selected angle having a depth, the improvement characterised in:

a turbine blade retention device installed in said gap, comprising:

a blade root retention clip disposed in said gap, the clip having an elongated web and including a forward and a rearward transverse flange extending radially outwardly and extending laterally from forward and rearward ends of the web, the web being disposed at said angle relative to the transverse flanges, at least one flange having a height when the web rests on the slot floor not exceeding the gap depth, the flanges engaging the forward and rearward faces of the rotor hub disk, and engaging the forward and rearward faces of the blade root; and a spacer for holding the clip radially outward in engagement with the forward and rearward faces of the blade root and rotor hub disk.

7. A method of assembling turbine blades on a rotor hub disk into an axially symmetric turbine rotor assembly, wherein the rotor hub disk has a thickness, a forward face and a rearward face with a peripheral circumferential array of spaced apart extending blade retention slots extending axially between the forward and rearward hub faces at a selected angle thereto, each slot having a radially inward floor of a selected width and two side walls, the rotor assembly including a plurality of radially extending turbine blades with blade roots, the blade roots and slot side walls each having mating ridges and grooves adapted for sliding engagement, the root having lateral sides disposed at said angle to forward and rearward root surfaces, each blade root having a bottom surface when assembled in the slot radially spaced from and adjacent the slot floor thus defining a gap extending between the forward and rearward hub faces at said selected angle having a depth, the method comprising:

installing a blade root retention clip in said gap, the clip having an elongated web and including a forward and a rearward transverse flange extending radially outwardly and extending laterally from forward and rearward ends of the web, the web being disposed at said angle relative to the transverse flanges, at least one flange having a height when the web rests on the slot floor not exceeding the gap depth, the flanges engaging the forward and rearward faces of the rotor hub disk;

sliding a blade root into each slot, over said one flange;

sliding a spacer between the slot floor and the clip thus sliding the clip radially outward into engagement with the forward and rearward faces of the blade root and rotor hub disk; and securing the spacer in position to retain the clip and blade root in the slot.

8. A method according to claim 7;

wherein the spacer has a forward tab at one end for abutting one face of the rotor hub disk, and has a length greater than the disk thickness such that an opposite end extends a distance beyond the other face of the disk when the spacer is positioned in the gap; and wherein, the step of securing the spacer comprises bending said opposite end of the spacer against the other face of the disk to form a rearward tab.

9. A turbine blade retention device according to claim 1 wherein said selected angle is an oblique angle.

10. An axially symmetric turbine rotor assembly according to claim 6 wherein said selected angle is an oblique angle.

11. A method according to claim 7 wherein said selected angle is an oblique angle.

* * * * *